April 15, 1969   M. L. DEVINEY, JR   3,439,043
PRODUCTION OF UNSATURATED CARBONYLIC COMPOUNDS
Filed Feb. 17, 1964
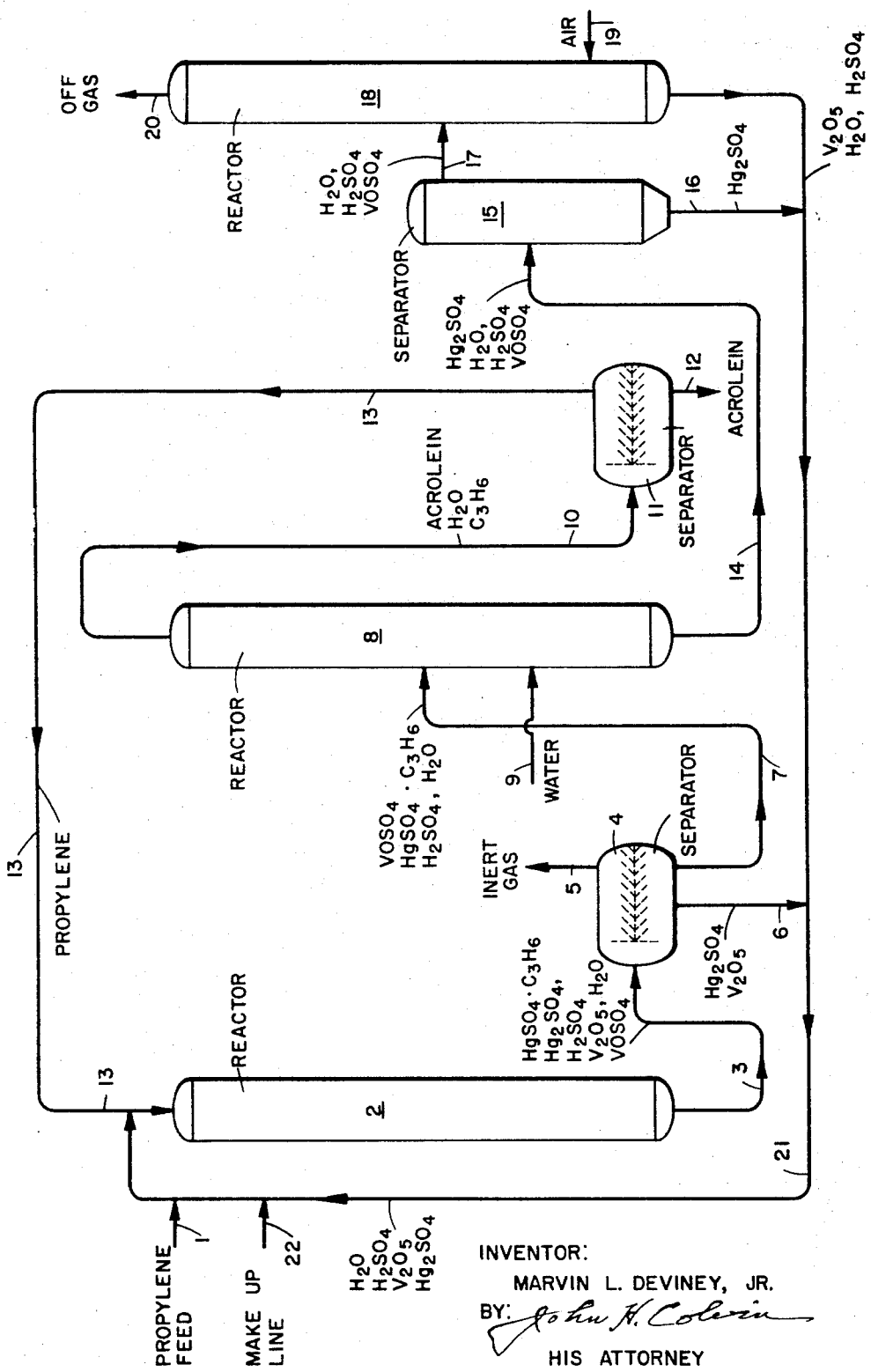
INVENTOR:
MARVIN L. DEVINEY, JR.
BY: John H. Colvin
HIS ATTORNEY United States Patent Office 3,439,043
Patented Apr. 15, 1969

3,439,043
PRODUCTION OF UNSATURATED
CARBONYLIC COMPOUNDS
Marvin L. Deviney, Jr., Pasadena, Tex., assignor to Shell Oil Company, New York, N.Y., a corporation of Delaware
Filed Feb. 17, 1964, Ser. No. 345,440
Int. Cl. C07c 45/02
U.S. Cl. 260—604                2 Claims This invention relates to an improved process for the production of unsaturated carbonylic compounds. More particularly, it relates to a process for the production of certain $\alpha,\beta$-ethylenically unsaturated carbonylic compounds by the oxidation of hydrocarbon olefins.

The oxidation of olefins to $\alpha,\beta$-ethylenically unsaturated carbonylic compounds is effected by a number of methods. Among these methods is the oxidation of olefins with mercuric ion. It is considered probable that the mercuric ion forms a complex or addition compound with the olefin, which complex, upon hydrolysis yields the desired carbonylic compound and mercury in a reduced oxidation state, generally the mercurous oxidation state. In practice, conversion of a portion of the mercurous ion back to the mercuric oxidation state is easily accomplished, since in the presence of olefin and in acid solution, the mercurous ion disproportionates to mercuric ion, observed as the olefin complex, and to elemental mercury. Inherent in all such procedures, however, is the problem of oxidizing the elemental mercury to an electropositive oxidation state wherein it is able to be further utilized in reaction with olefin. Absent some method for regeneration of the elemental mercury to an electropositive oxidation state, such methods of olefin oxidation are not economically feasible.

Conventional chemical methods of mercury regeneration typically involve separation of the mercury followed by vigorous oxidation procedures such as treatment with concentrated nitric acid, fuming sulfuric acid or chlorine. A milder and more convenient method for oxidation of the elemental mercury is disclosed by the French Patent 1,278,474 to Godin et al. wherein a large excess of ferric ion is incorporated into the mercuric ion-olefin reaction system to reoxidize the mercury reduced in the disproportionation reaction. This procedure merely temporarily avoids the problem of catalyst regeneration, as no suitable method is available for converting the ferrous ion, produced by reduction of the ferric ion with mercury, back to the ferric oxidation state in the aqueous acidic solution.

Thus, a cyclic and continuous reaction sequence is still not possible, as the duration of reaction time and the quantity of olefin converted is limited by the amount of ferric ion present. It would be of advantage to provide a continuous process for the production of carbonylic compounds by oxidation of olefins with mercuric ion which is completely cyclic in character.

It is therefore an object of the present invention to provide an improved process for the production of unsaturated carbonylic compounds. More particularly, it is an object of the invention to provide a continuous process for the production of certain $\alpha,\beta$-ethylenically unsaturated carbonylic compounds by oxidation of olefins with mercuric ion. A further object is to provide a process wherein the metallic species are regenerated within the reaction system. A specific object is to provide an improved process for the continuous production of acrolein from propylene.

The foregoing objects will be more clearly understood and others will become more apparent from the description of the invention which will be made in part with reference to the drawing in which the single figure is a flow diagram for the continuous production of $\alpha,\beta$-ethylenically unsaturated compounds from olefins.

It has now been found that these objects are accomplished by the process for the oxidation of olefins by mercury salts in the presence of a pentavalent vanadium compound. Briefly stated, the process of the invention comprises:

(1) Contacting a mono-olefin with a mercury salt, customarily a mercurous salt, to form a mercuric salt-olefin complex and, when mercurous salts are employed as reactants, elemental mercury;

(2) Oxidation of any elemental mercury to the mercurous oxidation state by reaction with pentavalent vanadium, the vanadium being reduced to the tetravalent oxidation state;

(3) Hydrolysis of the mercuric salt-olefin complex to produce an $\alpha,\beta$-ethylenically unsaturated carbonylic compound with provision for recycling the mercurous salt thereby produced;

(4) Oxidation of the tetravalent vanadium compound back to the pentavalent oxidation state by reaction with oxygen with provision for recycling the pentavalent vanadium product.

The use of pentavalent vanadium to oxidize the elemental mercury to mercurous ion and the subsequent facile oxidation of the vanadium back to the pentavalent oxidation state make possible a low-temperature catalyst regeneration process which allows the production of $\alpha,\beta$-ethylenically unsaturated carbonylic compounds by olefin oxidation with mercuric ion to be economically conducted in a continuous manner.

Although the process of the invention is applicable to olefins of varying types, best results are obtained when the olefin is an acyclic lower olefin, especially those acyclic hydrocarbon terminal lower mono-olefins having from 3 to 6 carbon atoms and having at least two allylic hydrogens; these include propylene, 1-butene, isobutylene, 1-pentene, 2-methyl-1-butene, 1-hexene and the like. Of these olefins, the utilization of propylene is preferred.

In the initial step of the reaction sequence, the olefin is contacted with a mercury salt in the presence of a pentavalent vanadium compound and aqueous acid. The mercury may be utilized in either the mercurous or the mercuric oxidation state, although for convenience, it will be considered that the mercury is present in the mercurous oxidation state as such will be the case after the first metallic species recycle, regardless of the oxidation state initially employed. The mercurous salt, in the presence of olefin, disproportionates to elemental mercury and the corresponding mercuric salt which forms a complex with the olefinic reactant. As the elemental mercury is being produced by the mercurous salt disproportionation, reaction with the pentavalent vanadium compound results in oxidation of the mercury to the mercurous oxidation state with attendant reduction of the vanadium to the tetravalent oxidation state. The mercurous salt thereby produced is suitable for further reaction with olefin. These simultaneous reactions occur until substantially all the mercury is converted to the mercuric salt-olefin complex, until all the olefin or all the pentavalent vanadium has been expended, or the reaction is intentionally terminated.

It should be understood that when the reaction sequence is initially begun, mercuric salts could be employed directly to form the olefin complex, in which case the vanadium compound could initially be present in the tetravalent oxidation state. As will be seen below, upon recycling the metallic species to the zone wherein the olefin complex is formed, the mercury will be present in the mercurous oxidation state, and the above-discussed reactions will occur.

The initial step of the process of the invention, i.e., formation of the mercuric salt-olefin complex, is conducted by mixing the olefin, mercury salt, pentavalent vanadium compound and aqueous acid in an autoclave or similar reaction vessel. The acid employed is a strong acid, that is, has a pH, defined as the negative logarithm of the molar hydrogen ion concentration of a 0.1 N aqueous solution of the acid at 25° C., which is below about 3. The acid preferably contains no labile halogen atoms, that is, the acid is not a hydrogen halide such as hydrogen chloride, and contains no anion which readily complexes with mercury ions. Although inorganic acids such as phosphoric acid and nitric acid, as well as organic acids such as trichloroacetic acid and p-toluensulfonic acid may be employed, it is preferred to utilize sulfuric acid as the acid in the process of the invention. The acid is employed in aqueous solution. Concentrations of acid from about 0.5% to about 15% by weight are suitable, although the use of solutions from about 1% to about 10% by weight are preferred.

As it is desirable to minimize the number of types of anion in the reaction mixture, the mercury salts are preferably salts of the acid that is employed, e.g., when aqueous sulfuric acid is utilized, the use of mercury sulfates is preferred. Although the mercury salts may be prepared in sit, as by reaction of an oxide with the aqueous acid, it is preferred to employ preformed mercury salts. The amount of mercury salt is not critical, as the mercury salt is not consumed in the overall reaction process. Good results are obtained when the amount of mercury salt, calculated as the mercurous salt, is from about 2% to about 20% by weight of the reaction mixture, although an amount from about 5% to about 15% by weight on the same basis is preferred.

For similar reasons, the pentavalent vanadium is preferably employed without introducing additional types of anion. It is convenient to introduce the pentavalent vanadium in the form of the oxide, which, to the extent that it is soluble in the acidic solution, probably is transformed to a complex salt. For example, in the presence of sulfuric acid, soluble pentavalent vanadium may exist as the salt $(VO_2)_2SO_4$, while the insoluble pentavalent vanadium remains as the pentoxide or as a hydrated form thereof. The vanadium compound is employed in amounts equivalent to or in excess over the mercury salt present. Molar ratios of pentavalent vanadium to mercurous ion from about 1:1 to about 5:1 are suitable, while molar ratios from about 1:1 to about 3:1 are preferred.

The olefin is introduced to the reaction system as a substantially pure material or may be utilized as a mixture with inert materials, e.g., the corresponding saturated hydrocarbon, such as would be obtained from a commercial olefin source. The presence of saturated hydrocarbon does not appear to be detrimental, however, and the unreacted saturate is easily removed by a subsequent separation. However, for reasons of ease of handling, the use of substantially pure olefin is preferred.

The method of mixing the reactants is not critical, although it is preferred to initially mix the inorganic materials and add the olefin thereto. The process of forming the mercuric salt-olefin complex and the reactions which occur simultaneously therewith are preferably conducted at comparably low temperatures. Suitable reaction temperatures vary from about 0° C. to about 70° C., although best results are obtained when temperatures from about 20° C. to about 55° C. are employed. The reaction is suitably conducted at pressures which are atmospheric or above, e.g., from about 1 atmosphere to about 30 atmospheres. Best results are obtained when pressures sufficient to at least partially liquify the olefin are employed, which pressures are typically from about 125 p.s.i.g. to about 175 p.s.i.g. when a reaction temperature of about 25° C. is employed.

Subsequent to formation of the mercuric salt-olefin complex, the product mixture is removed and separated by conventional means, e.g., filtration, decantation, centrifugation, pressure reduction and the like, into component phases. Should saturated hydrocarbon have been present in the original olefin feed, it is conveniently removed at this stage as a gas and, subsequent to purification procedures such as washing with water, becomes suitable for numerous applications. The product mixture frequently contains insoluble material, principally a mixture of unreacted mercurous salt and pentavalent vanadium compound, which material is removed and returned to the complex formation zone for further reaction with olefin. The aqueous acidic solution containing the soluble mercuric salt-olefin complex and the soluble tetravalent vanadium compound, generally a vanadyl salt, is passed to a reactor wherein the complex is decomposed to obtain the desired carbonylic compound.

The mercuric salt-olefin complex is decomposed by hydrolysis to produce the $\alpha,\beta$-ethylenically unsaturated carbonylic compound and the mercurous salt corresponding to the mercuric salt from which the complex was formed. Hydrolysis is effected by contacting the solution containing the complex with water at elevated temperature. Although hydrolysis may be effected by mixing the solution containing the complex with water and then raising the mixture to an elevated temperature, best results are obtained when the complex-containing solution is quickly contacted with water at or about the desired temperature for hydrolysis, e.g., from about 80° C. to about 150° C., as by adding the solution in increments to water at or near the boiling point or by contacting the solution with steam, e.g., in a steam-stripper. The hydrolysis reaction is suitably conducted at pressures which are atmospheric or above, and the optimum reaction temperature for hydrolysis will depend in part upon the pressure employed. When the hydrolysis is conducted at atmospheric pressure, reaction temperatures from about 85° C. to about 110° C. are most suitably utilized, although higher reaction temperatures, e.g., from about 105° C. to about 130° C., are preferably employed when hydrolysis is conducted at superatmospheric pressure. During hydrolysis, or subsequent thereto, the carbonylic compound is removed from the complex formation zone as by sweeping the zone with a gaseous stream, such as water vaporized under the hydrolysis conditions, steam in excess over that required to decompose the complex, or alternatively an inert gas such as nitrogen, argon or the like. For best results, all or at least a major portion of the water added in excess of that required for hydrolysis is removed so that the acid concentration of the liquid effluent will not be substantially different from that of the solution before formation of the mercuric salt-olefin complex.

The gaseous effluent from the complex decomposition contains, as the organic portion, a mixture of the unsaturated carbonylic compound and the olefin employed as a starting material. As the probable stoichiometric relation of the hydrolysis reaction requires that three moles of olefin be produced for each mole of carbonylic compound, the unconverted olefin will represent the major portion of the gaseous hydrolysis product. This result is not overly detrimental, however, as after the carbonylic compound is removed by condensation or selective absorption in water or other solvent, the olefin is suitable for recycling or, upon drying, is suitable for other purposes which require a high purity olefin. The $\alpha,\delta$-ethylenically unsaturated carbonylic compound is then purified and/or separated from solvent or adsorbant by conventional methods, e.g., fractional distillation.

The non-gaseous effluent from the complex decomposition zone comprises a mixture of an aqueous acidic solution of tetravalent vanadium salt and the essentially insoluble mercurous salt formed during hydrolysis of the mercuric salt-olefin complex. This mixture is separated into its component phases as by filtration or like methods and the insoluble mercurous salt may be recycled to the complex formation zone, while the aqueous acidic solution containing the tetravalent vanadium is passed to a reaction zone wherein it is subjected to an oxidizing process whereby the vanadium is returned to the pentavalent oxidation state.

The tetravalent vanadium is oxidized by contact with an oxygen-containing gas, by which term is meant a gas at least part of which is molecular oxygen. The oxygen-containing gas may be substantially pure oxygen, or may be oxygen mixed with other non-detrimental gaseous materials. Largely for reasons of economics, the use of air as the oxygen-containing gas is preferred, the other components of air not being detrimental to the process of vanadium oxidation. The oxidation of tetravalent vanadium is conducted at elevated temperatures and preferably at elevated pressures. Temperatures from about 120° C. to about 250° C. are preferred, although best results are obtained when temperatures from about 160° C. to about 220° C. are employed. Pressures under which the reaction is conducted will in part be dependent upon the oxygen content of the oxygen-containing gas. It is desired to conduct the reaction under oxygen pressures from about 3 to about 30 atmospheres, preferably from about 4 to about 20. When substantially pure oxygen is employed, the pressure of added gas will suitably be within such a range. Of course, when air or other gas is not entirely oxygen is used, the total pressure must be somewhat higher to afford a pressure of oxygen, i.e., an oxygen partial pressure, within the desired range. Best results are obtained when means are provided to enable efficient mixing of the gas and liquid phases during the oxidation process.

The length of reaction time, although typically a period of several hours, will vary depending upon the extent of tetravalent vanadium conversion desired. If an excess of vanadium has been employed, it is not necessary to oxidize the entire amount of vanadium back to the pentavalent oxidation state. It is, of course, desirable to provide sufficient pentavalent vanadium to react with the mercury produced by disproportionation of the mercurous salt present in the system, but the presence of soluble tetravalent vanadium in the catalyst mixture recycled for complex formation does not appear to be detrimental and in fact may be beneficial to the complex formation procedure by modifying the solvating power of the reaction medium. Subsequent to oxidation of the vanadium, the product mixture which typically contains soluble and insoluble pentavalent vanadium compounds and possibly soluble tetravalent vanadium salts is mixed with the mercurous salt separated in the prior operation and the mixture of metallic compounds and aqueous acid is returned to the initial reactor for further reaction with olefin.

The foregoing description of the invention may be more readily understood by a description of the practice thereof made with reference to the accompanying drawing. For convenience and clarity, the operation is described in terms of the preferred modification wherein propylene is oxidized to acrolein by mercury sulfate in the presence of aqueous sulfuric acid and vanadium pentoxide. The gaseous propylene feed, which may or may not contain propane, is introduced by line 1 to a complex formation zone 2 wherein mercurous sulfate and vanadium pentoxide have been introduced by line 21 in the form of an aqueous sulfuric acid solution and slurry. The formed mercuric sulfate-propylene complex, together with unreacted propane, mercurous sulfate and vanadium pentoxide as well as byproduct vanadyl sulfate is passed by line 3 to a separation zone 4 where the propane is removed by line 5 for possible further treatment and unreacted mercurous sulfate and vanadium pentoxide is removed and passed by line 6 to the recycle line 21 and thence back to the olefin complex formation zone. The aqueous acidic solution containing the mercuric sulfate-olefin complex is passed by line 7 to a complex decomposition zone 8 wherein the solution is contacted with steam introduced through line 9. The effluent gas is passed by line 10 to a separation zone 11 wherein the acrolein product is recovered and removed through line 12 for finishing. The byproduct propylene is recycled by line 13 back to the complex formation zone. Nongaseous effluent from the complex decomposition zone is passed by line 14 to a separator 15 wherein the insoluble mercurous sulfate is removed and passed by line 16 to the recycle line 21. The solution from the separator containing aqueous acidic vanadyl sulfate is passed through line 17 to a vanadium reoxidation zone 18 where the solution is contacted with oxygen-containing gas introduced at line 19. The spent off gas is removed by line 20 and the aqueous acidic solution and insoluble vanadium pentoxide is removed and returned to the complex formation zone by line 21. Line 22 represents a makeup line by which metallic species or acid may be added to compensate for physical losses.

For convenience and clarity, the location of the necessary means for providing heat, refrigeration, stirring and the like have been omitted form the drawing. The location of such means will be apparent to one skilled in this art.

It should be understood that the process of the invention is applicable to the production of $\alpha,\beta$-ethylenically unsaturated carbonylic compounds other than acrolein. For example, methacrolein is produced from reaction of isobutylene in an analogous manner, methyl vinyl ketone is produced from 1-butene, and the principal product from reaction of 1-hexene is propyl vinyl ketone.

To further illustrate the process of the invention, the following examples are provided. It should be understood that they are not to be regarded as limitations, as the teachings thereof may be varied as will be understood by one skilled in this art.

Example I

To a one-liter Hastelloy C mixing vessel was charged 30.1 g. of mercurous sulfate, 8.0 g. of vanadium pentoxide, 12.0 g. of sulfuric acid and 650 ml. of distilled water. The mixture was stirred 5.5 hours at 25° C. under an atmosphere of high purity propylene at 150 p.s.i.g. The unreacted mercurous sulfate and vanadium pentoxide was separated by filtration and the filtrate containing soluble mercuric sulfate-propylene complex and vanadyl sulfate was boiled at 100° C. under a small nitrogen purge. The acrolein product was trapped in two water scrubbers at 3° C. From the hydrolysis reaction was recovered 15.3 g. of mercurous sulfate and upon this basis, the yield of acrolein was 26.4%. The filtrate from the hydrolysis reaction was oxidized to pentavalent vanadium in a three hour run in a glass-lined, two-liter vessel at 150° C. under an oxygen pressure of 50 p.s.i.g. Completion of the reaction was evidenced by a complete color change from the blue color of soluble vanadyl sulfate to the yellow color of slightly soluble vanadium pentoxide and by the weight of precipitate recovered.

Example II

Into a one-liter glass vessel equipped with a condenser was charged 50.1 g. of mercurous sulfate, 4.5 g. of vanadium pentoxide, 5.1 g. of sulfuric acid and 500 ml. of water. Propylene was passed into the mixture at 25° C. until all the vanadium pentoxide had reacted, approximately 3.5 hours. The suspension was filtered and the filtrate, designated filtrate A, was set aside. The precipitate, almost entirely mercurous sulfate, was mixed with 4.4 g. of vanadium pentoxide, 6.1 g. of sulfuric acid and 500 ml. of water and reacted with propylene under similar reaction conditions to give a mixture which afforded, upon filtering, a filtrate B and a mercurous sulfate precipitate. The precipitate was again returned to the reaction vessel, mixed with 5.0 g. of vanadium pentoxide, 4.8 g. of sulfuric acid and 500 ml. of water and again reacted with propylene at 25° C. until all the vanadium pentoxide had reacted. Upon filtering the product mixture, a filtrate C was obtained which was combined with filtrates A and B.

The combined filtrate was added dropwise over a six-hour period to a boiling solution of 500 ml. of water and 26.5 g. sulfuric acid. The acrolein product was swept out by a small nitrogen purge and trapped in two water scrubbers at 3° C. Based upon the mercurous sulfate recovered, the yield of acrolein was 42%.

Example III

A mixture was made of 4.0 g. mercurous sulfate, 2.1 g. of sulfuric acid and 200 ml. of water. Introduction of propylene into the mixture resulted in formation of mercuric sulfate-propylene complex and elemental mercury. Vanadium pentoxide was added to the solution in approximately 0.25 g. increments at 15 minute intervals until a total of 1.1 g. had been added. After filtering, the filtrate was boiled to hydrolyze the complex and mercurous sulfate was recovered.

Example IV

Propylene was passed through a suspension of 60 g. mercuric sulfate, 120 g. vanadyl sulfate dihydrate and 500 ml. of water until all the mercuric sulfate had been converted to the propylene complex. The blue solution of vanadyl sulfate and complex was added dropwise to 900 ml. of boiling water containing 100 g. of sulfuric acid. The acrolein produced was condensed in two ice water traps and the mercury was recovered as mercurous sulfate. The acrolein yield was 73.2% based on the original mercuric sulfate.

Example V

A solution of 31.9 g. vanadyl sulfate dihydrate, 4.1 g. sulfuric acid and 800 ml. of water were heated to 190° C. for 5 hours under an oxygen pressure of 360 p.s.i.g. Analysis of the oxidation product liquid and precipitate by a potentiometric titration method indicated that at least 82% of the tetravalent vanadium had been oxidized to the pentavalent state.

Example VI

A mixture of 160 mg. of mercury, 41 mg. of vanadium pentoxide, 4.748 g. of sulfuric acid and 100 ml. of water were mixed and stirred at 25° C. Within 5 minutes, the yellow vanadium pentoxide suspension had disappeared and the solution turned pale blue evidencing formation of vanadyl sulfate. Suspended mercurous sulfate was also observed in the mixture as the result of oxidation of the mercury.

Example VII

A suspension of 50 g. of mercuric oxide in a mixture of 40 g. of phosphoric acid and 500 ml. of water was placed in a reaction vessel and propylene was passed through until the mixture turned clear and colorless, indicating that the propylene-mercuric ion complex had formed. The temperature was raised to 105° C. and acrolein was produced.

Example VIII

A mixture of 260 g. vanadyl sulfate dihydrate, 38.8 g. of sulfuric acid and 969 g. of water were heated for 5.5 hours at 150° C. in a glass-lined reactor under an oxygen pressure of 60 p.s.i.g. Of the tetravalent vanadium originally present, 39% was converted to pentavalent vanadium compounds. About half the pentavalent vanadium precipitated as the pentoxide and its hydrates while the remainder remained in solution in soluble forms, primarily as $(VO_2)_2SO_4$. Analysis were by a potentiometric titration method.

I claim as my invention:
1. The process for the production of acrolein by
 (a) contacting propylene in an initial reaction zone with aqueous sulfuric acid, mercurous sulfate and an inorganic pentavalent vanadium oxygen-containing compound,
 (b) hydrolyzing the resulting product mixture by contact with water at a temperature from about 80° C. to about 150° C., thereby producing acrolein,
 (c) separating the mercurous sulfate hydrolysis product from the nongaseous hydrolysis product mixture and oxidizing the hydrolysis product solution by contacting with oxygen-containing gas at a temperature from about 120° C. to about 250° C. and oxygen pressure from about 3 atmospheres to about 30 atmospheres, and
 (d) returning the pentavalent vanadium oxidation product and said product mercurous sulfate to the initial reaction zone.
2. The process for the production of acrolein by
 (a) contacting propylene in an initial reaction zone with aqueous sulfuric acid, mercurous sulfate, and an inorganic pentavalent vanadium oxygen-containing compound,
 (b) hydrolyzing the resulting product mixture by contact with water at a temperature from about 80° C. to about 150° C. and a pressure at least atmospheric, thereby producing acrolein,
 (c) separating the mercurous sulfate hydrolysis product from the nongaseous hydrolysis product mixture and oxidizing the hydrolysis product solution by contacting with air at a temperature from about 120° C. to about 250° C. and a pressure from about 3 to about 30 atmospheres, and
 (d) returning the pentavalent vanadium oxidation product and said product mercurous sulfate to the initial reaction zone.

References Cited

UNITED STATES PATENTS

| 3,133,968 | 5/1964 | Kummer | 260—604 |
| 2,197,258 | 4/1940 | Macallum | 260—604 |

FOREIGN PATENTS

| 920,278 | 3/1963 | Great Britain. |
| 918,186 | 2/1963 | Great Britain. |

OTHER REFERENCES

McCay et al.: J. A. C. S. 44, 1018–1021, 1922.
Handbook of Chemistry and Physics, 32nd edition, Chem. Pub. Co., 1950, pp. 1498–1499.

LEON ZITVER, *Primary Examiner.*

R. H. LILES, *Assistant Examiner.*

U.S. Cl. X.R.

260—597